United States Patent
Meisenzahl et al.

(10) Patent No.: US 7,414,655 B2
(45) Date of Patent: Aug. 19, 2008

(54) CHARGE-COUPLED DEVICE HAVING MULTIPLE READOUT PATHS FOR MULTIPLE OUTPUTS

(75) Inventors: Eric J. Meisenzahl, Ontario, NY (US); Herbert J. Erhardt, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 579 days.

(21) Appl. No.: 11/048,467

(22) Filed: Jan. 31, 2005

(65) Prior Publication Data

US 2006/0170799 A1 Aug. 3, 2006

(51) Int. Cl.
*H04N 5/335* (2006.01)
(52) U.S. Cl. .................. 348/315; 348/250; 348/257
(58) Field of Classification Search ......... 348/314–324, 348/220.1, 206.1, 208.1, 294, 250, 257
See application file for complete search history.

(56) References Cited

U.S. PATENT DOCUMENTS

| | | | | |
|---|---|---|---|---|
| 4,330,796 A | | 5/1982 | Anagnostopoulos et al. | |
| 4,607,287 A | * | 8/1986 | Endo et al. | 348/219.1 |
| 4,647,977 A | * | 3/1987 | Tower | 348/321 |
| 5,049,998 A | * | 9/1991 | Lee | 348/241 |
| 5,650,352 A | * | 7/1997 | Kamasz et al. | 438/60 |
| 5,715,002 A | | 2/1998 | Cortiula | |
| 6,686,962 B1 | * | 2/2004 | Miyahara | 348/311 |
| 6,819,351 B2 | * | 11/2004 | O'Hara et al. | 347/237 |
| 7,027,093 B2 | * | 4/2006 | Miyahara | 348/313 |
| 2004/0012684 A1 | * | 1/2004 | Tinnerino | 348/208.1 |

FOREIGN PATENT DOCUMENTS

| EP | 0 866 502 | | 9/1998 |
|---|---|---|---|
| EP | 866502 A2 | * | 9/1998 |

* cited by examiner

*Primary Examiner*—Tuan Ho
*Assistant Examiner*—Usman Khan
(74) *Attorney, Agent, or Firm*—Peyton C. Watkins

(57) ABSTRACT

An image sensor comprising a plurality of pixels arranged in at least two sub-arrays; first and second delay areas respectively connected to each sub-array for respectively receiving charge from the sub-array; wherein a pitch of the first delay area is different from the second delay area and at least two readout mechanisms for respectively receiving the charge from the delay areas, wherein a same line from the first and second sub-arrays is received by each delay area at substantially the same time.

12 Claims, 3 Drawing Sheets

CHARGE-COUPLED DEVICE HAVING MULTIPLE READOUT PATHS FOR MULTIPLE OUTPUTS

FIELD OF THE INVENTION

The invention relates generally to the field of charge-coupled devices and, more particularly, to such charge-coupled devices having four readout devices for permitting efficient readout of the image signal.

BACKGROUND OF THE INVENTION

Typically, prior art charge coupled devices, such as that disclosed in EPO Patent EP0866502, discloses a sub-array of pixels respectively coupled to 4 intermediate registers. The four intermediate registers are respectively coupled to four horizontal register segments each of which is coupled to an output node structure.

Although the presently known charge-coupled devices are satisfactory, improvements are always desirable. A variety of multiple output designs permit design choices during manufacturing which is always desirable due to flexibility in layout, cost efficiencies and spatial considerations.

Consequently, a need exists for an image sensor with four readouts that permits alternative design choices.

SUMMARY OF THE INVENTION

The present invention is directed to overcoming one or more of the problems set forth above. Briefly summarized, according to one aspect of the present invention, the invention resides in an image sensor comprising a plurality of pixels arranged in at least two sub-arrays; first and second delay areas respectively connected to each sub-array for respectively receiving charge from the sub-array; wherein a pitch of the first delay area is different from the second delay area; and at least two readout mechanisms for respectively receiving the charge from the delay areas, wherein a same line from the first and second sub-arrays is received by each delay area at substantially the same time.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantage of an image sensor with four readout devices that consumes less surface area than the prior art and consequently has lower associated costs.

DETAILED DESCRIPTION OF THE INVENTION

Figure 1:
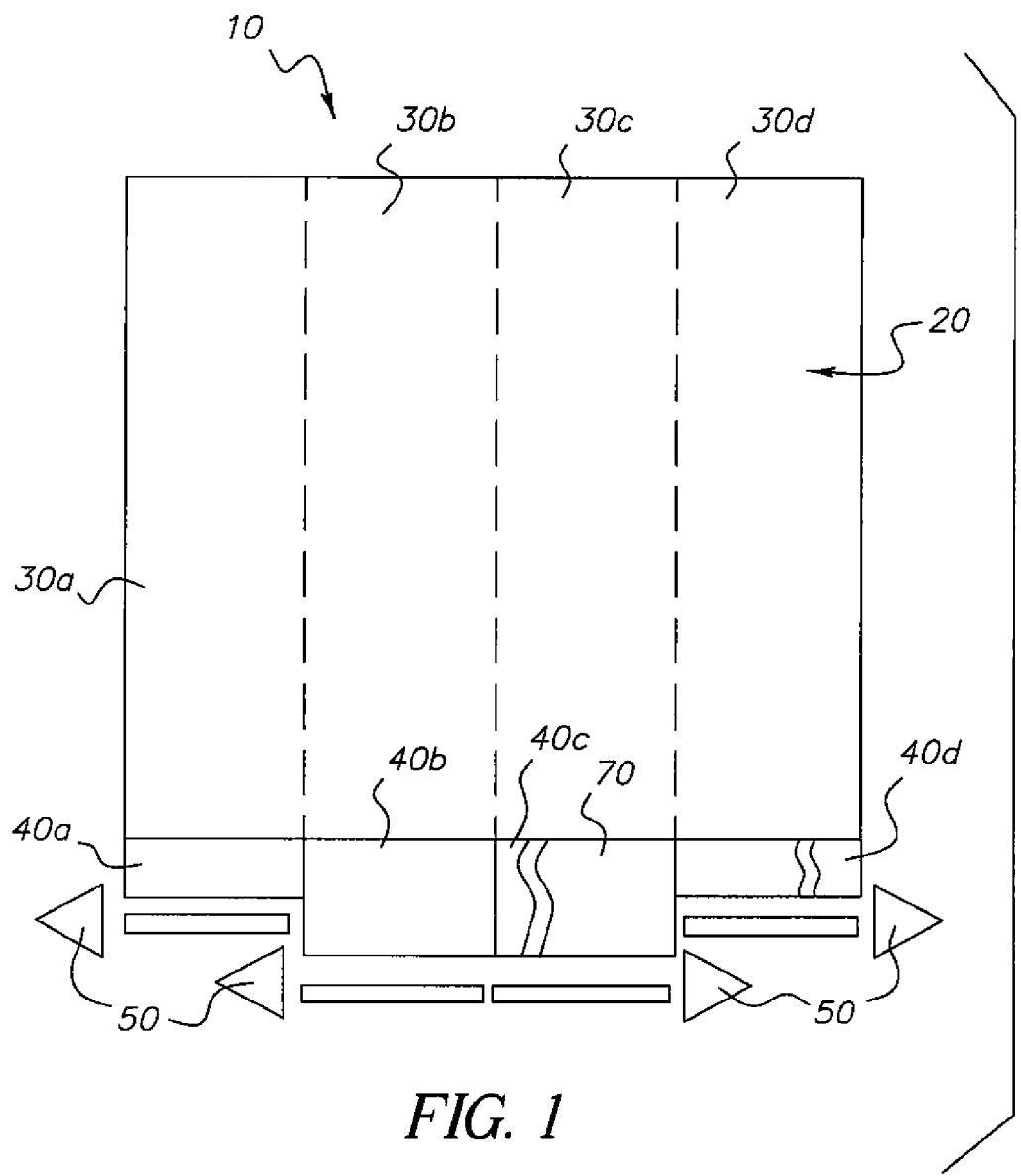
FIG. 1 is a top view of the image senor of the present invention.

Referring to FIG. 1, there is shown a top view of the image sensor 10 of the present invention, preferably a charge-coupled device. The image sensor 10 includes a plurality of pixels 20 arranged in a plurality of rows and columns which, in turn, is arranged into a plurality of sub-arrays 30a, 30b, 30c and 30d, four sub-arrays in the preferred embodiment. A delay area 40a, 40b, 40c and 40d is respectively connected to each sub-array 30a, 30b, 30c and 30d for receiving charge from the sub-arrays. A horizontal readout 50 is respectively connected to each delay area 40a, 40b, 40c and 40d for receiving the charge from the delay areas 40a, 40b, 40c and 40d for further processing.

Figure 2:
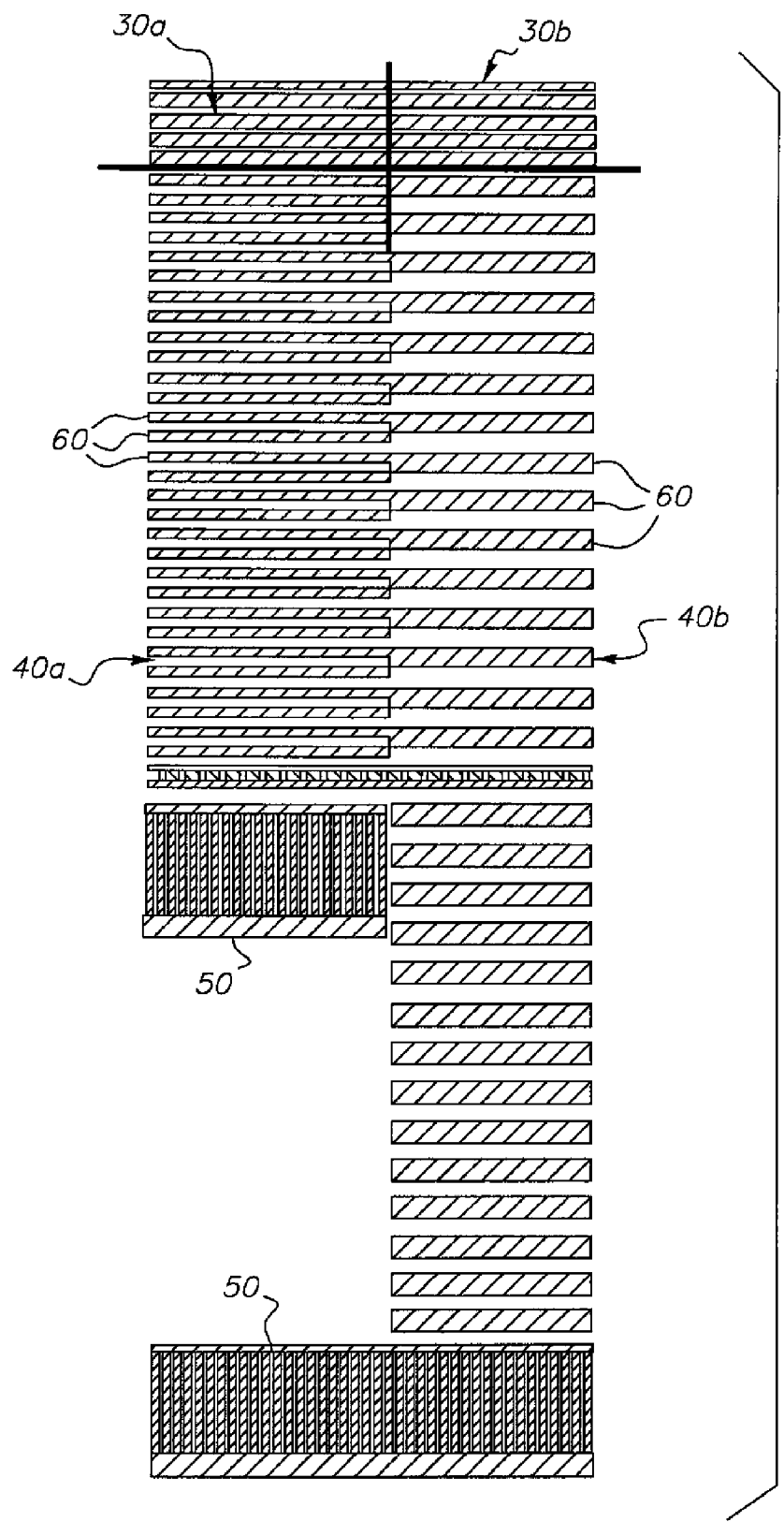
FIG. 2 is an exploded view of a portion of FIG. 1.

Referring to FIGS. 1 and 2, the outer delay areas 40a and 40d preferably include the same pitch as the sub-array 30a and 30d to which it is respectively connected. The inner delay areas 40b and 40c preferably include a pitch, which is a multiple of two longer than the outer delay area 40a and 40d. In essence, the pitch of the outer delay areas 40a and 40d should be different from the inner delay areas 40b and 40c. It is noted that the outer and inner delay areas 40a, 40b, 40c and 40d preferably include the same number of delay elements 60. This enables the same line from the outer and inner delay areas to be received by each horizontal readout 50 at substantially the same time. It is also instructive to note that the outer and inner delay areas 40a, 40b, 40c and 40d are operated at the same clock cycle in this embodiment. The clock cycles could be different if the number of delay areas is correspondingly altered. A light shield 70 spans and covers the delay areas 4a-d for prohibiting light from being disposed on the delay areas 40a, 40b, 40c and 40d. (FIG. 1 discloses only the light shield 70 covering the delay areas 40c and 40d for clarity of illustrating the light shield.)

Figure 3:
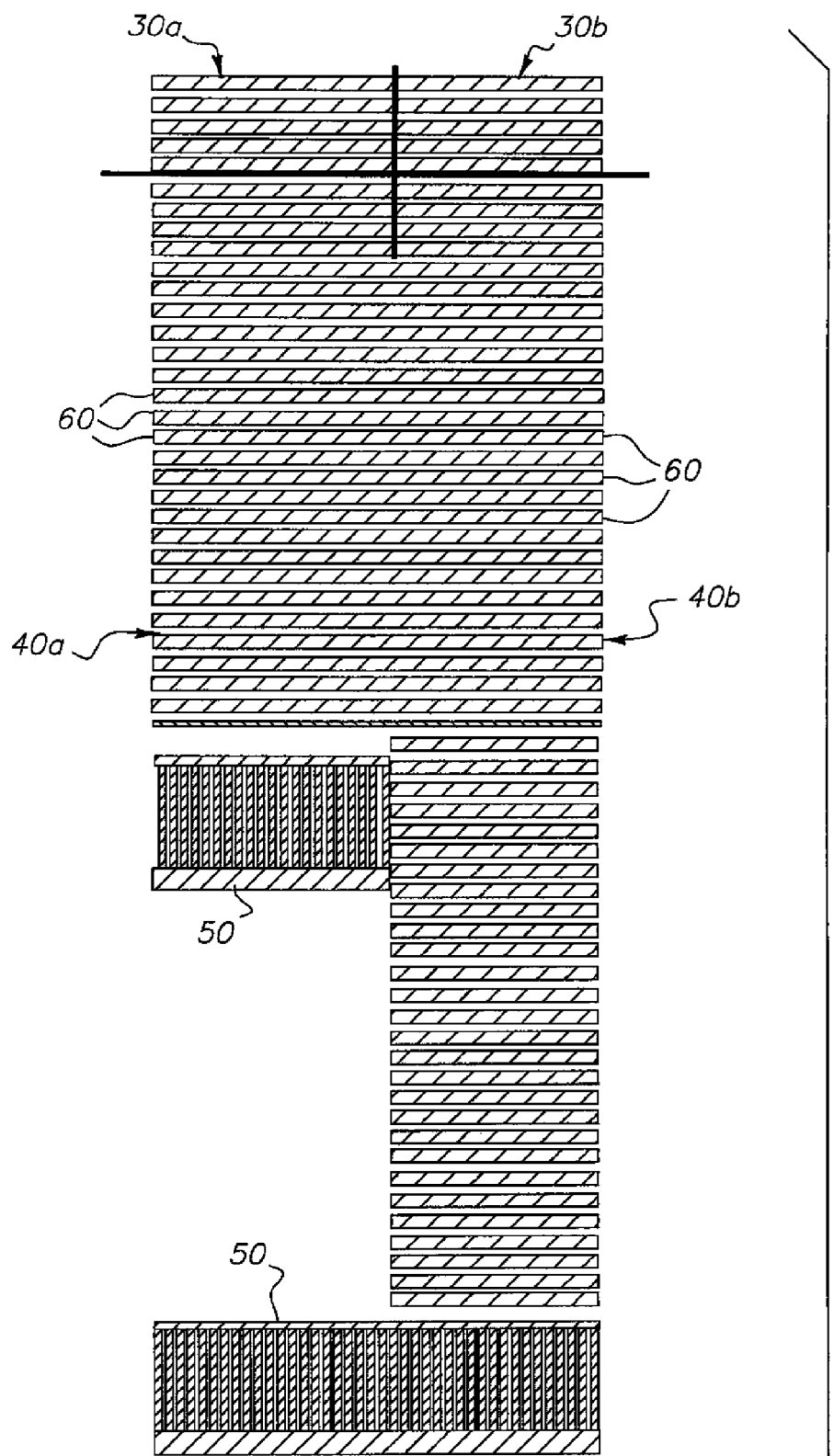
FIG. 3 is an alternate embodiment of the present invention.

Referring to FIG. 3, there is shown an alternative embodiment of the present invention. In this embodiment, the number of delay elements 60 in the outer 40a and inner delay 40b areas are different, for example by a factor of 2. (Delay area 40b includes twice as many delay elements as delay area 40a) The clock cycles would be corresponding different so that the same line from the sub-arrays is received by the horizontal readout at substantially the same time. For example, the clock cycle of the delay area with the greater number of delay elements would be operated at twice as fast as the delay area with the lesser number of delay elements.

Figure 4:
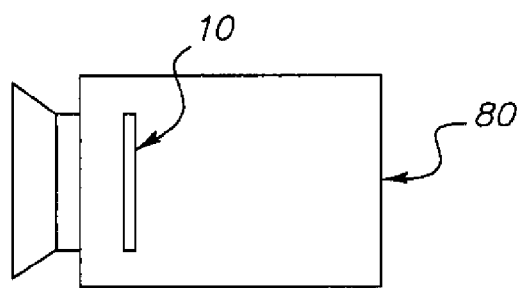
FIG. 4 is a simplified diagram of a digital camera that can use the image sensor of the present invention.

Referring to FIG. 4, there is shown a digital camera 80 for illustrating a typical commercial embodiment for the image sensor 10 of the present invention. As is well known in the art, the image sensor 10 is disposed in the camera 80 for capturing incident light that is converted into electrons for forming an electronic representation of an image.

The invention has been described with reference to a preferred embodiment. However, it will be appreciated that variations and modifications can be effected by a person of ordinary skill in the art without departing from the scope of the invention.

PARTS LIST 10 image sensor
20 pixels
30a sub-array of pixels
30b sub-array of pixels
30c sub-array of pixels
30d sub-array of pixels
40a delay areas
40b delay areas 40c delay areas
40d delay areas
50 horizontal readout outputs
60 delay elements
70 light shield
80 digital camera

The invention claimed is:

1. An image sensor comprising:
    (a) a plurality of pixels arranged in at least two sub-arrays;
    (b) at least two delay areas each connected to a respective sub-array for receiving charge from the sub-array; wherein a pitch of a first plurality of delay elements within at least one of the delay areas is different from a pitch of a second plurality of delay elements within the other delay areas; and
    (c) at least two readout mechanisms for receiving the charge from respective delay areas, wherein the at least two delay areas receive a same line from their respective sub-arrays at substantially the same time.

2. The image sensor as in claim 1, wherein the increment of the pitch of the first plurality of delay elements is substantially two.

3. The image sensor as in claim 1, wherein the at least two delay areas have an equal number of delay elements to enable the charge to be transferred to respective readout mechanisms at substantially the same time.

4. The image sensor as in claim 1, wherein the image sensor is a charge-coupled device type.

5. The image sensor as in claim 4, wherein the first and second plurality of delay elements are extensions of the sub-arrays.

6. The image sensor as in claim 5 further comprising a light shield spanning the first and second plurality of delay elements so that the delay elements are not photosensitive.

7. A digital camera comprising:
    an image sensor comprising:
        (a) a plurality of pixels arranged in at least two sub-arrays;
        (b) at least two delay areas each connected to a respective sub-array for receiving charge from the sub-array; wherein a pitch of a first plurality of delay elements within at least one of the delay areas is different from a pitch of a second plurality of delay elements within the other delay areas; and
        (c) at least two readout mechanisms for receiving the charge from respective delay areas, wherein the at least two delay areas receive a same line from their respective sub-arrays at substantially the same time.

8. The camera as in claim 7, wherein the increment of the pitch of the first plurality of delay elements is substantially two.

9. The camera as in claim 7, wherein the at least two delay areas have an equal number of delay elements to enable the charge to be transferred to respective readout mechanisms at substantially the same time.

10. The camera as in claim 7, wherein the image sensor is a charge-coupled device type.

11. The camera as in claim 10, wherein the first and second plurality of delay elements are extensions of the sub-arrays.

12. The camera as in claim 11 further comprising a light shield spanning the first and second plurality of delay elements so that the delay elements are not photosensitive.

* * * * *